April 15, 1958 F. S. MILLER 2,830,551
SELF-CENTERING PNEUMATIC INSIDE LINE-UP
PIPE CLAMP ASSEMBLY
Filed June 21, 1954 4 Sheets-Sheet 1
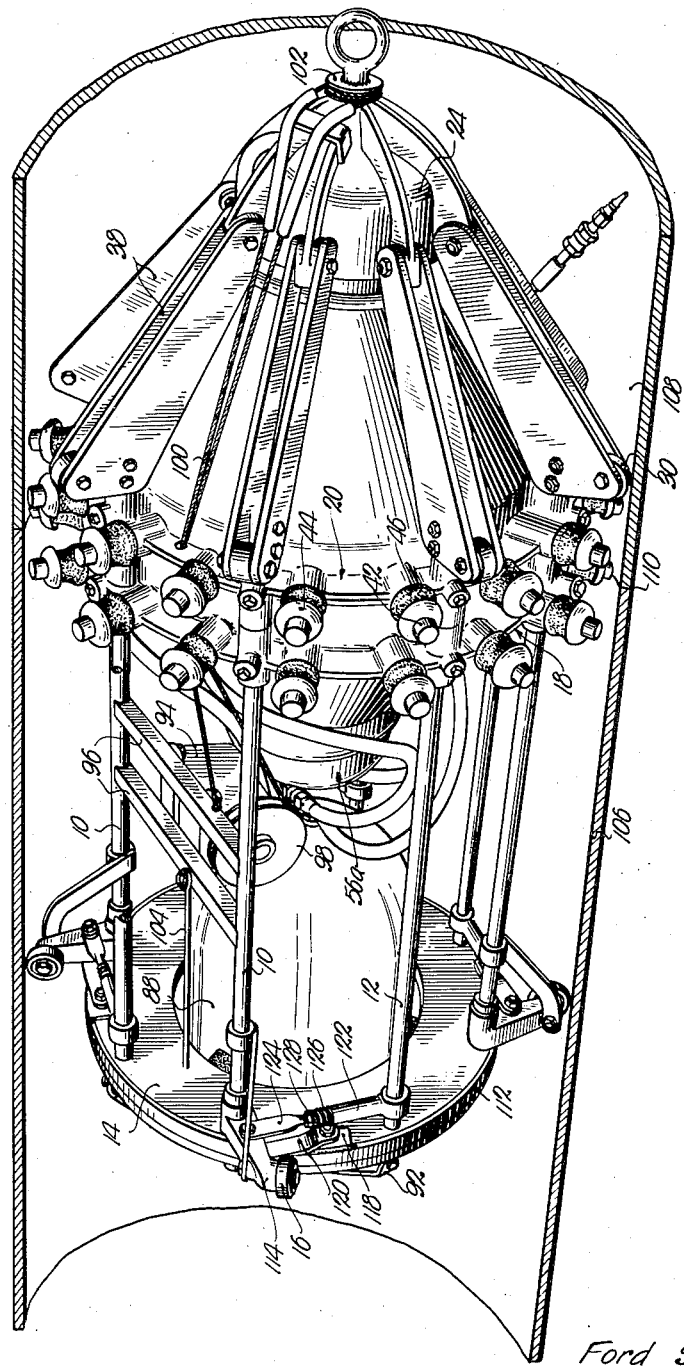
Fig. 1.
INVENTOR.
Ford S. Miller
BY
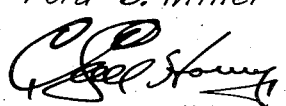
ATTORNEY.

April 15, 1958

F. S. MILLER 2,830,551

SELF-CENTERING PNEUMATIC INSIDE LINE-UP PIPE CLAMP ASSEMBLY

Filed June 21, 1954

INVENTOR.
Ford S. Miller
BY
ATTORNEY.

April 15, 1958  F. S. MILLER  2,830,551
SELF-CENTERING PNEUMATIC INSIDE LINE-UP
PIPE CLAMP ASSEMBLY
Filed June 21, 1954  4 Sheets-Sheet 4
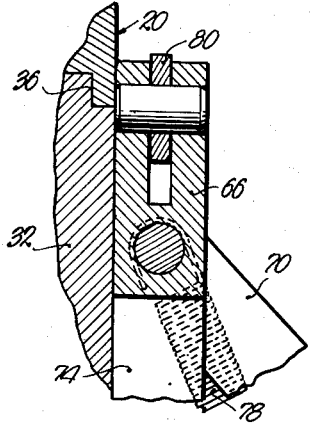
Fig. 5.
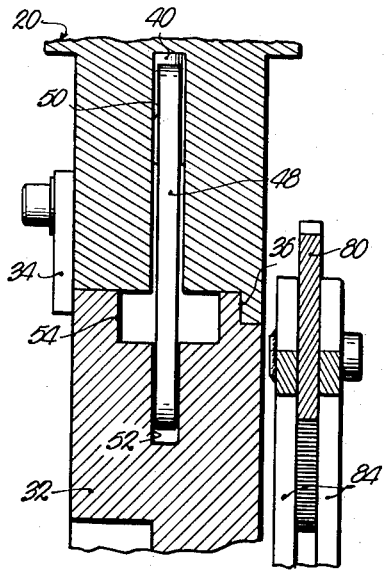
Fig. 6.
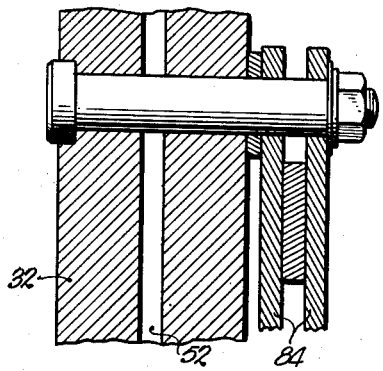
Fig. 7.
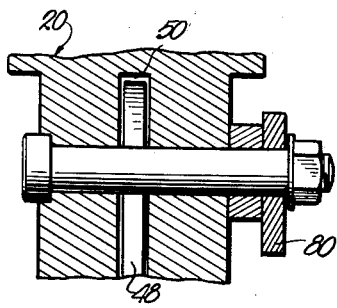
Fig. 8.
INVENTOR.
Ford S. Miller
BY
ATTORNEY.

United States Patent Office 2,830,551
Patented Apr. 15, 1958

2,830,551

SELF-CENTERING PNEUMATIC INSIDE LINE-UP PIPE CLAMP ASSEMBLY

Ford S. Miller, Winfield, Kans., assignor of one-fifth to Nellie M. Miller, one-fifth to E. L. Van Laningham, one-fifth to George L. Thomas, and one-fifth to John L. Miller, all of Winfield, Kans.

Application June 21, 1954, Serial No. 437,923

9 Claims. (Cl. 113—102)

This invention relates to pipe-line equipment and particularly to apparatus for facilitating the holding of pipe sections in end-to-end, aligned, abutting relationship while such proximal ends are welded together.

It is the primary object of the instant invention to provide an inside line-up clamp capable not only of releasably holding the pipe sections in proper relationship for welding, but being sufficiently powerful as to actually form the pipe sections into proper cylindrical configurations having equal diameters at the juncture where subsequent welding is to take place.

Another important object of this invention is to provide an inside line-up clamp that is self-centering within the pipe because of the provision of equalizing mechanism and pipe-gripping structure forming a part of the overall assembly.

It is an important aim of the instant invention to provide a clamp assembly having cooperating parts capable, when brought into engagement with the inner walls of the pipe sections, of maintaining the entire unit aligned with the longitudinal axes of the pipes while power is applied to form the proximal ends into proper size and configuration, and throughout the time the sections are held in end-to-end relationship during the welding step.

A further object of this invention is to provide improved pipe-engaging structure in an inside line-up clamp through utilization of an annular series of radially reciprocable pipe-engaging pins, together with power means for forcing the pins outwardly against the pipe with great force and equalized pressure.

Still another object of the instant invention is to provide for novel centering means cooperable with the aforesaid pins including pipe-engaging rollers so operably interconnected as to hold one end of the clamp assembly remote from the pins in a proper position within the pipe.

Other objects include the way in which two sets of pin units are forced radially outwardly against the pipe sections with great force through use of pneumatic means; the manner of condensing the component parts of the assembly by using opposed power means, each provided with a ram reciprocable on the longitudinal center line of the clamp assembly; the manner in which spaced sets of rollers support the assembly within the pipes; the manner of mounting one set of rollers for equalized swinging movement toward and away from the inner wall of the pipe; and many more minor objects including important details of construction to be made clear as the following specification progresses.

In the drawings:

Figure 1 is a perspective view of a pair of end-to-end pipe sections broken away to illustrate the self-centering pneumatic inside line-up pipe clamp assembly made pursuant to the present invention.

Fig. 5 is an enlarged, fragmentary, detailed, cross-sectional view taken on line V—V of Fig. 4.

Fig. 6 is an enlarged, fragmentary, detailed, cross-sectional view taken on line VI—VI of Fig. 4.

Fig. 7 is an enlarged, fragmentary, detailed, cross-sectional view taken on line VII—VII of Fig. 4; and Fig. 8 is an enlarged, fragmentary, detailed, cross-sectional view taken on line VIII—VIII of Fig. 4.

The primary support or means for coupling together the various components of the clamp assembly about to be described, includes a plurality of elongated, substantially parallel, longitudinal rods 10 and 12 shown in Figs. 1 to 4 inclusive of the drawings.

Figure 2:
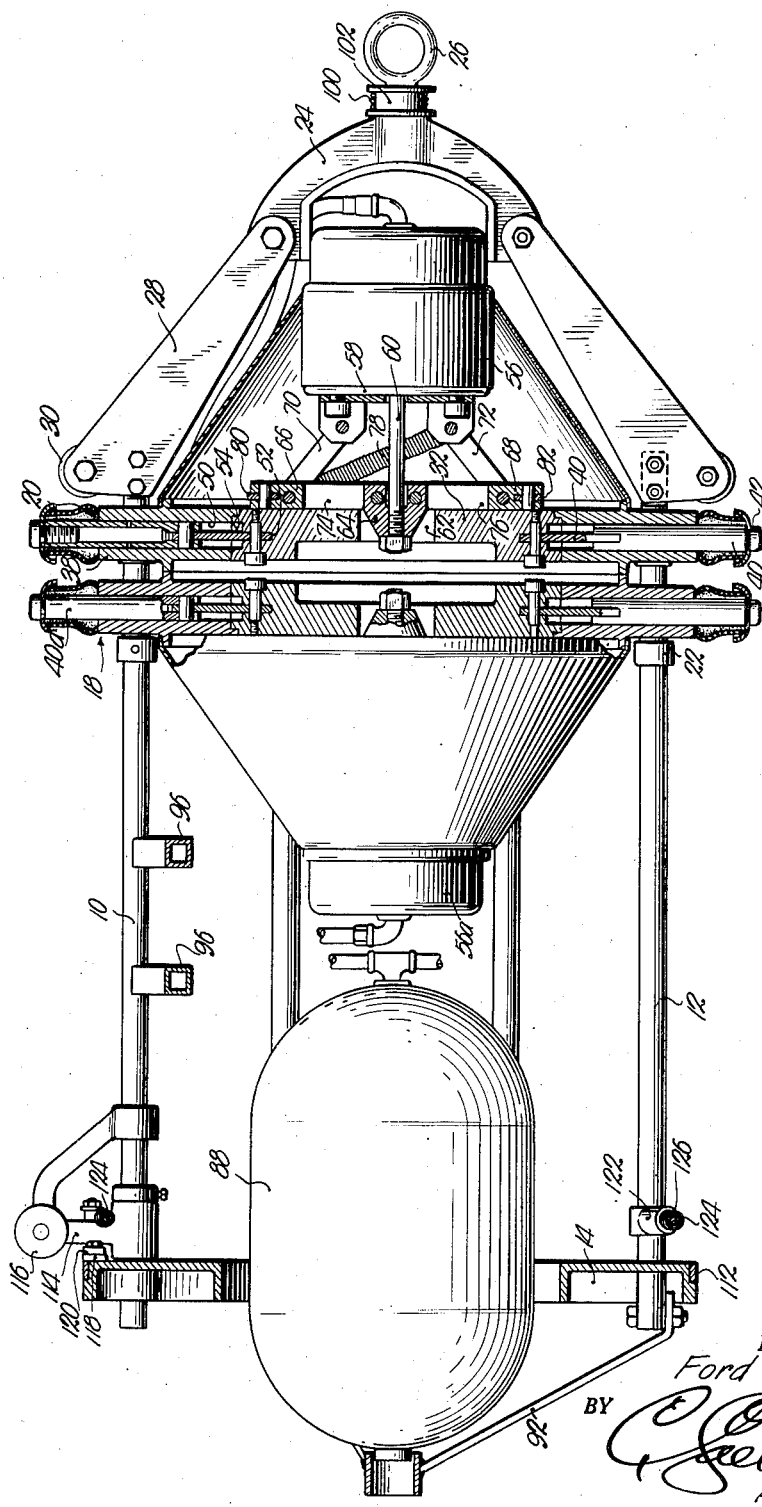
Fig. 2 is a side elevational view of the clamp assembly showing a substantial portion thereof in longitudinal cross-section to reveal details of construction.
Figure 3:
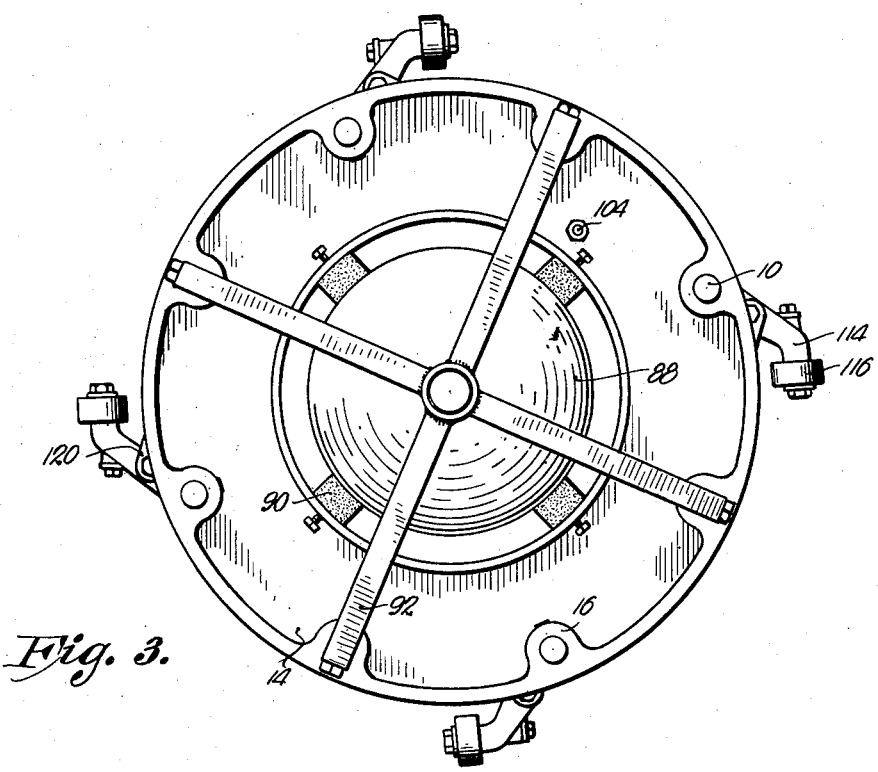
Fig. 3 is an elevational view showing that end of the assembly not seen in Fig. 1 of the drawings.
Figure 4:
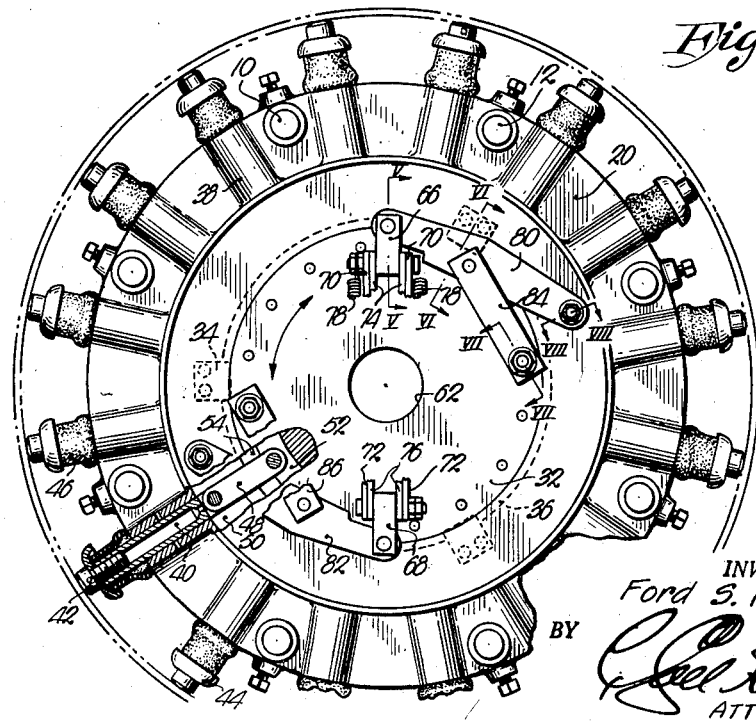
Fig. 4 is an enlarged, elevational view of the opposite end of the clamp assembly with the stationary rollers, towing structure, and proximal air cylinder entirely removed, parts being broken away and in section for clearness.

The eight alternately disposed rods 10 and 12 are arranged in a circular pattern as seen in Figs. 3 and 4 and pass through an end plate or disc 14 shown in Figs. 1 to 3 inclusive. Disc 14 is provided with set-screw bosses 16 receiving the rods 10 and 12 and releasably securing the disc 14 rigidly to the rods 10 and 12.

Rods 10 and 12 pass through a pair of side-by-side, circular rings 18 and 20 at their opposite ends and the latter are held against movement toward the end disc 14 by setscrew collars 22 on the rods 10 and 12.

A hollow head 24 provided with a rotatable eyelet 26 is rigidly connected with the rods 10 and 12 by a number of pairs of spaced bars 28 that converge toward the head 24 and mount pipe-engaging rollers 30 disposed adjacent the ring 20.

The component parts of the rings 18 and 20 are identical in all respects and, therefore, in describing and identifying the structure associated with ring 20, it is to be understood that like parts and elements are provided for the ring 18, notwithstanding the fact that the same are not hereinafter described and identified in the drawings.

Ring 20 surrounds a circular disc 32 that is in turn mounted for limited rotation with respect to the ring 20, it being noted that disc 32 is confined for rotation between retainers 34, seen in Figs. 2, 4 and 6, and a lap joint 36 between the disc 32 and the ring 20 illustrated in Figs. 2, 4, 5 and 6. Retainers 34 are releasably secured to that face of ring 20 proximal to the ring 18 and extend into partial overlapping relationship to the dic 32.

Ring 20 is provided with an annular series of radial cylinders 38, each of which telescopically receives a tubular pin 40 for reciprocation radially toward and away from the axis of rotation of the disc 32. Each pin 40 in turn has a headed stud 42 extending thereinto that in turn retain caps 44 that hold flexible sleeves 46 in place and which sleeves 46 extend over the outermost ends of the cylinders 38. The bifurcated, innermost ends of the pins 40 pivotally receive an inwardly extending link 48 and the links 48 are all pivotally secured to the disc 32 adjacent its outermost periphery.

It is to be noted in Figs. 2, 4, 6 and 8 that ring 20 is provided with a continuous clearance slot 50 for the links 48 facing inwardly toward the periphery of disc 32 and sufficiently wide to permit inward movement of the pins 40 into the slot 50 when the pins 40 are retracted from the extended position shown in Figs. 1, 2, 4 and 6. Similarly, disc 32 has a peripheral slot 52 permitting free swinging movement of the links 48 and which is enlarged as at 54 to clear the innermost ends of the pins 40 when the latter are retracted.

Power means chosen for illustration to oscillate the disc 32 within and with respect to the ring 20, includes a pneumatic cylinder 56 carried by the head 24, as seen in Fig. 2, and provided with a reciprocable piston 58 that has an outwardly-extending rod 60 disposed on the longitudinally center line of the clamp assembly and extending into a clearance opening 62 within the disc 32 (Figs. 2 and 4) when piston 58 and rod 60 are extended as shown in Fig. 2 to in turn extend the pins 40.

Rod 60 has a head 64 rigidly secured thereto operably coupled with the piston 58. A pair of diametrically opposed blocks 66 and 68 slidable radially along the outermost face of the disc 32 toward and away from the rod 60 are pivotally connected to the piston 58 by two pairs of links 70 and 72 respectively shown converging toward the piston 58 in Fig. 2, and also illustrated in Fig. 4 of the drawings. One of the links 70 is additionally shown in Fig. 5. Blocks 66 and 68 are also pivotally connected with the block 64 by two pairs of links 74 and 76 respectively, illustrated in flat engagement with the outer face of disc 32 in Fig. 2 of the drawings. Springs 78 interconnect blocks 66 and piston 58 adjacent links 72.

It is noted that the axes of swinging movement of all of the links 70, 72, 74 and 76 are in parallelism, but such axes extend oppositely to the axes of a pair of swingable arms 80 and 82 that pivotally interconnect blocks 66 and 68 respectively, with the ring 20. Similarly, the axes of swinging movement of a pair of connecting links 84 and 86 are substantially parallel with the axis of reciprocable movement of the rod 60. Links 84 and 86 pivotally interconnect arms 80 and 82 respectively with the disc 32.

Air pressure is supplied to the cylinder 56, and of course, to cylinder 56a for ring unit 18, by means of a pressure supply tank 88 that extends through the end disc 14 as seen in Figs. 1, 2 and 3 and held in place not only by spacer blocks 90 (Fig. 3) but by a rearwardly extending spider 92 secured to the proximal ends of certain of the rods 10—12.

Pressure tank 88 is operably coupled with the pneumatic cylinders 56 and 56a in a suitable manner through a control valve mounted on slide bars 96 spanning the distance between one pair of the rods 10 as seen best in Fig. 1 of the drawings. Valve 94 may be controlled in any suitable manner and, for purposes of illustration, there is provided a control pulley 98 for the valve 94 around which is trained a continuous control cable 100 secured not only to the pulley 98, but to a second pulley 102 fixed to the eyelet 26 for rotation therewith in the head 24.

Cable 100 is threaded through the rings 18 and 20 and operates to rotate the pulley 98 when eyelet 26 is rotated. Cable 100 is held taut by an adjusting rod 104 connected with one of the bars 96 and extending through the end disc 14.

With respect to the operation of valve 94, it may be pointed out that upon rotation of the eyelet 26 in one direction a predetermined distance, cylinder 56a is supplied with pressure to expand its corresponding pins 40a of ring structure 18 into engagement with the innermost face of pipe section 106 shown in Fig. 1. Thereupon, continued rotation of eyelet 26 holds the pressure in cylinder 56a and supplies pressure from tank 88 to the cylinder 56 to expand the pins 40 into engagement with the innermost face of pipe section 108 shown in Figs. 1 and 4, and which is in abutting relationship to the pipe section 106 for attachment thereto by welding at joint 110. After the joint 110 is thus interconnected, eyelet 26 may be manipulated to evacuate both cylinders 56 and 56a, whereby the pins 40 and 40a are all retracted by the action of springs 78.

Self-centering means is also provided for that end of the clamp assembly adjacent disc 14. Such mechanism includes an annular band 112 surrounding the periphery of end disc 14 (see Figs. 1 and 2) and rotatable thereon. Each of the rods 10 has a radius arm 114 swingable thereon adjacent the band 112 that are in turn provided with rollers 116 engageable with the pipe section 106. Band 112 is provided with an inturned ear 118 for each arm 114 respectively, overlapping the inner face of disc 14 and the ears 118 are pivotally connected with the arms 114 by links 120. Each rod 12 mounts a swingable tube 122 into which extends a freely reciprocable pin 124. The pins 124 are pivotally connected to the arms 114, and are yieldably biased outwardly by springs 126 coiled thereabout and extending into the tubes 122. The tension of springs 126 may be varied by an adjusting nut 128 on the rods 124.

Operation

Through use of the coupling eyelet, the clamping assembly may be manipulated through pipes to be interconnected and initially positioned within the section 106 substantially as shown in Fig. 1 of the drawing. The position of the radius arms 114 with respect to the supporting rods 10 upon which they are swingably mounted, is determined by the diameter and cross-sectional configuration of the pipe section 106.

Rollers 116 ride freely along the section 106 and, by virtue of their operable connection with the rotatable band 112, the rearmost end of the assembly adjacent the end disc 14, is centered automatically within the pipe section 106. If the pipe 106 is not truly cylindrical as is often the case, rollers 116 nevertheless engage the pipe section 106 firmly and are held biased tightly thereagainst by the action of the springs 126.

As any one of the arms 114 swings on its supporting rod 10, similar swinging movement is imparted to each of the remaining arms 114 because of the operable connection between the arms 114 and the rotatable band 112 through the connecting links 120. The pressure of the rollers 116 on the pipe section 106 is equalized by the combined cooperative action of all of the springs 126.

When the clamp assembly is thus positioned within the pipe section 106 with disc 14 substantially centered on the longitudinal axis of pipe 106 by the action of radius arms 114, the operator manipulates eyelet 26 to supply cylinder 56a with air pressure, thereby expanding all of the pins 40a simultaneously and equally into tight engagement with the pipe section 106 adjacent the joint 110. The ring unit 18 is capable of exerting great force against the pipe section 106 to not only center the ring 18 with respect thereto, but to shape the pipe section 106 so that it is truly cylindrical and, therefore, adapted to meet properly with the proximal end of pipe section 108.

The section 108 is thereupon threaded upon the clamp assembly and particularly in surrounding relationship to the pins 40 of ring unit 20. The operator then manipulates the eyelet 26 to supply air pressure to the cylinder 56. As the piston 58, and therefore, the rod 60, as well as the head 64, are moved outwardly to the position shown in Fig. 2, blocks 66 and 68 are shifted apart radially against the action of springs 78 and through links 70 and 72, as well as links 74 and 76.

The blocks 66 and 68 slide radially outwardly along the disc 32, they swing the arms 80 and 82 away from each other on their pivotal connections with the ring 20 and, looking at Fig. 4, it is seen that such movement of the arms 80 and 82 imparts a pull upon links 84 and 86 to rotate the disc 32 anti-clockwise. This action forces the pins 40 to the position shown in Fig. 4 through the pivotal connection of links 48 between the disc 32 and the pins 40. Conversely, when the air pressure is exhausted from the cylinder 56, springs 78 act to pull the blocks 66 and 68 radially toward the head 64, thereby retracting the piston 58 into the cylinder 56, swinging the arms 80 and 82 toward each other, rotating disc 32 clockwise, viewing Fig. 4, and retracting the rods 40 inwardly away from the inner face of pipe section 108.

After the joint 110 is welded, the operator disengages the ring units 18 and 20 as just described. The clamp assembly may thereupon be advanced along pipe section 108 to the next joint by use of eyelet 26. During such movement, the rollers 30 and 116 support the assembly for free movement until the clamp assembly is again placed in use to not only align the pipes, but to form and hold the same during the welding operation.

Having thus described the invention what is claimed as new and desired to be secured by Letters Patent is:

1. In a self-centering, inside line-up pipe clamp assembly provided with a pair of radially expandable structures, a support for said structures including at least three rods arranged in a circle; a member mounted on the rods and provided with a circular periphery; an annular band surrounding the member and rotatable on said periphery; a radius arm swingably mounted on each rod respectively and each provided with a pipe-engaging roller; means pivotally connecting the arms with said band for effecting simultaneous swinging movement of the arms when the band is rotated; and resilient means for yieldably holding the arms biased outwardly.

2. In a self-centering, inside line-up pipe clamp assembly provided with a pair of radially expandable structures, a support for said structures including at least three arm-supporting rods and an equal number of spring-supporting rods arranged alternately and in parallelism in a circle; a member mounted on the rods and provided with a circular periphery; an annular band surrounding the member and rotatable on said periphery; an arm swingably mounted on each arm-supporting rod respectively, each arm being provided with a pipe-engaging roller; spring means operably interconnecting each arm respectively with a spring-supporting rod for holding the arms biased outwardly; and links pivotally connecting the arms with the band for effecting simultaneous movement of the arms when the band is rotated.

3. In a pipe clamp assembly, a support; a ring secured to the support; a disc rotatably carried by the ring, said ring surrounding the disc; a plurality of pipe-engaging pins carried by the ring for reciprocation radially toward and away from the axis of rotation of the disc, said pins being spaced about the entire periphery of the ring; linkage means pivotally connected with the pins and with the disc for reciprocating the pins upon rotation of the disc; linkage structure pivotally connected with the ring and with the disc for rotating the latter upon swinging of the structure; and means mounted on the support and coupled with the structure for swinging the latter.

4. In a pipe clamp assembly, a support; a ring secured to the support; a disc rotatably carried by the ring, said ring surrounding the disc; a plurality of pipe-engaging pins carried by the ring for reciprocation radially toward and away from the axis of rotation of the disc; linkage means pivotally connected with the pins and with the disc for reciprocating the pins upon rotation of the disc, said pins being spaced about the entire periphery of the ring; linkage structure pivotally connected with the ring and with the disc for rotating the latter upon swinging of the structure; power means mounted on the support and having a linearly reciprocable member; and linkage means pivotally connected with said member and with the structure for swinging the latter upon energization of the power means.

5. In a pipe clamp assembly, a support; a ring secured to the support; a disc rotatably carried by the ring, said ring surrounding the disc; a plurality of pipe-engaging pins carried by the ring for reciprocation radially toward and away from the axis of rotation of the disc, said pins being spaced about the entire periphery of the ring; means pivotally connecting the pins with the disc for reciprocating the pins upon rotation of the disc; swingable structure on the ring; means pivotally connecting said structure with the disc for rotating the latter upon swinging of the structure; a pneumatic prime mover mounted on the support and provided with a ram reciprocable along a line extending through said axis of rotation of the disc; and linkage pivotally interconnecting the ram and the structure for swinging the latter as the ram is reciprocated.

6. In a self-centering inside line-up pipe clamp assembly, a support; a pair of opposed power cylinder units mounted on the support and having pistons provided with aligned rams linearly reciprocable toward and away from each other; a pair of side-by-side, coaxial clamp mechanisms between the units, each including a ring secured to the support; a disc rotatably carried by the ring, said ring surrounding the disc, a plurality of pipe-engaging pins carried by the ring for reciprocation radially toward and away from the axis of rotation of the disc, said pins being spaced about the entire periphery of the ring, and means pivotally connecting the pins with the disc for reciprocating the pins upon rotation of the disc; and means operably coupling each ram with a corresponding disc for translating reciprocatory motion of the ram into rotation of the disc.

7. In an inside pipe clamp assembly, a support; and a pair of spaced, self-centering mechanisms, one of said mechanisms including a plurality of radius arms, each provided with a pipe-engaging roller, each mounted on the support for swinging movement toward and away from the pipe when the assembly is disposed within the pipe, and each having means for resiliently urging the same outwardly, and means operably interconnecting the arms for simultaneous swinging movement, said rollers being arranged in a circle, the other of said mechanisms including a ring secured to the support; a disc rotatably carried by the ring, said ring surrounding the disc, a plurality of pipe-engaging pins carried by the ring for movement radially outwardly away from the axis of rotation of the disc and into engagement with the pipe, said pins being spaced about the entire periphery of the ring, means pivotally connecting the pins with the disc for reciprocating the pins upon rotation of the disc, and means mounted on the support and coupled with the disc for rotating the latter.

8. In a self-centering, inside line-up pipe clamp assembly provided with a pair of radially expandable structures, a support for said structures; a member mounted on the support; a rotatable element carried by the member; at least three radius arms swingably mounted on the support; a pipe-engaging roller operably mounted on each arm and each having means for resiliently urging the same outwardly, said rollers being arranged in a circle; and means pivotally connecting the arms with said element for effecting simultaneous movement of the arms when the element is rotated.

9. In a self-centering, inside line-up pipe clamp assembly provided with a pair of radially expandable structures, a support for said structures including at least three rods arranged in a circle; a member mounted on the rods and provided with a circular periphery; an annular band surrounding the member and rotatable on said periphery; a radius arm swingably mounted on each rod respectively and each provided with a pipe-engaging roller and each having means for resiliently urging the same outwardly, said rollers being arranged in a circle; and means pivotally connecting the arms with said band for effecting simultaneous swinging movement of the arms when the band is rotated.

References Cited in the file of this patent
UNITED STATES PATENTS

| Number | Name | Date |
|---|---|---|
| 963,603 | Lunceford | July 5, 1910 |
| 1,346,812 | Duston | July 20, 1920 |
| 1,515,728 | Clark | Nov. 18, 1924 |
| 1,692,789 | Young | Nov. 20, 1928 |
| 2,413,103 | Forbes | Dec. 24, 1946 |
| 2,557,346 | Green | June 19, 1951 |
| 2,638,069 | Mearns | May 12, 1953 |
| 2,655,977 | Hodgkins | Oct. 20, 1953 |